United States Patent
Crinon et al.

(10) Patent No.: US 8,929,443 B2
(45) Date of Patent: Jan. 6, 2015

(54) RECOVERING FROM DROPPED FRAMES IN REAL-TIME TRANSMISSION OF VIDEO OVER IP NETWORKS

(75) Inventors: Regis J. Crinon, Camas, WA (US); Walid Ali, Sammamish, WA (US); Nelson Philip Pinto, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1354 days.

(21) Appl. No.: 12/350,975

(22) Filed: Jan. 9, 2009

(65) Prior Publication Data

US 2010/0177776 A1   Jul. 15, 2010

(51) Int. Cl.
*H04N 7/12*   (2006.01)
*H04N 19/103*   (2014.01)
*H04L 12/64*   (2006.01)
*H04N 19/102*   (2014.01)

(52) U.S. Cl.
CPC ....... *H04N 7/26015* (2013.01); *H04N 7/26021* (2013.01); *H04L 12/6418* (2013.01)
USPC ................................. 375/240.12; 375/240.27

(58) Field of Classification Search
None
See application file for complete search history.

(56) References Cited

U.S. PATENT DOCUMENTS

| | | | |
|---|---|---|---|
| 5,319,648 A * | 6/1994 | Bux et al. | 714/748 |
| 5,321,397 A | 6/1994 | Stone | |
| 6,289,054 B1 | 9/2001 | Rhee | |
| 6,530,055 B1 * | 3/2003 | Fukunaga | 714/746 |
| 6,874,118 B1 | 3/2005 | Pirzadeh et al. | |
| 7,684,430 B2 * | 3/2010 | Gaur et al. | 370/447 |
| 2002/0159525 A1 | 10/2002 | Jeong | |
| 2003/0097631 A1 | 5/2003 | Cheung | |
| 2004/0027991 A1 * | 2/2004 | Jang et al. | 370/230 |
| 2005/0036546 A1 * | 2/2005 | Rey et al. | 375/240.12 |
| 2006/0005101 A1 | 1/2006 | Li et al. | |
| 2006/0013318 A1 | 1/2006 | Webb et al. | |
| 2008/0100694 A1 * | 5/2008 | Barkley et al. | 348/14.08 |
| 2008/0115185 A1 | 5/2008 | Qiu et al. | |

OTHER PUBLICATIONS

Rhee, et al., "Error Recovery for Interactive Video Transmission over the Internet", retrieved at <<http://ieeexplore.ieee.org/stamp/stamp.jsp?arnumber=00848254>>, IEEE Journal on Selected Areas in Communications, vol. 18, No. 6, Jun. 2000, p. 1033-1049.

(Continued)

*Primary Examiner* — Hassan Phillips
*Assistant Examiner* — Mark A Mais
(74) *Attorney, Agent, or Firm* — Andrew Smith; Jim Ross; Micky Minhas (57) ABSTRACT

Technologies for recovering from dropped frames in the real-time transmission of video over an IP network are provided. A video streaming module receives a notification from a receiving module that a data packet has been lost. The video streaming module determines, based on the type of video frame conveyed in the lost packet and the timing of the lost packet in relation to the sequence of video frames transmitted to the receiving module, whether or not a replacement video frame should be sent to the receiving module. If the video streaming module determines a replacement video frame is warranted, then the video streaming module instructs a video encoding module to generate a replacement video frame and then transmits the replacement video frame to the receiving module.

20 Claims, 8 Drawing Sheets

(56) References Cited

OTHER PUBLICATIONS

Chen, et al., "Error-Resilient Real-Time Video Communications over IP-Based LANS", retrieved at <<http://arbor.ee.ntu.edu.tw/~mschen/paperps/ma_icme01.pdf>>, p. 4.

Golston, et al., "Video Compression: System Trade-Offs with H.264, VC-1 and other Advanced CODECs", retrieved at http://www.industrialcontrols.eetchina.com/PDF/2007JUN/ICCOL_2007JUN01_IMDS_DASE_TA_02.pdf?SOURCES=DOWNLOAD>>, White Paper, Aug. 2006, p. 1-16.

Richardson, Iain, "H.264 and MPEG-4 Video Compression", retrieved at <<http://www.sauronz.com/manuales/H.264.And.MPEG-4.Video.Compression.pdf>>, p. 1-306.

* cited by examiner

RECOVERING FROM DROPPED FRAMES IN REAL-TIME TRANSMISSION OF VIDEO OVER IP NETWORKS

BACKGROUND

Real-time transmission of video over the Internet involves the transmission of a sequence of pictures or frames from a source computer to one or more destination computers. The sequence of frames is often generated by a video encoder module, according to one of any number of video compression and encoding standards. Each frame is divided into packets and the packets are transmitted or "streamed" by the source computer to the destination computers over an enterprise-wide IP network or the Internet.

Because of the nature of Internet communications, it is possible that one or more of the packets in the video stream may be lost during transmission, or may arrive at the destination computer corrupted. Traditional techniques for the streaming of video over the Internet may account for the loss of a packet in the video steam by retransmitting the individual packet to the destination computer, or including error correction information in the transmission, as in forward error correction ("FEC"). These techniques may reduce efficiency of available bandwidth utilization, however, since they often result in the unnecessary re-transmission of data or redundant data transmitted in the video stream.

It is with respect to these considerations and others that the disclosure made herein is presented.

SUMMARY

Technologies are described herein for recovering from dropped frames in the real-time transmission of video over an IP network. According to this description, a video streaming module receives a notification from a receiving module that a data packet has been lost. The video streaming module determines, based on the type of video frame conveyed in the lost packet and the timing of the lost packet in relation to the sequence of video frames transmitted to the receiving module, whether or not a replacement video frame should be sent to the receiving module. If the video streaming module determines that a replacement video frame is warranted, then the video streaming module instructs a video encoding module to generate a replacement video frame and then transmits the replacement video frame to the receiving module.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for recovering from dropped frames during the real-time transmission of video over an IP network. Utilizing the technologies described herein, a video streaming module can be implemented that increases the efficiency of bandwidth utilization by reducing the number of re-transmissions of lost or corrupt data packets in the video stream.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and that show, by way of illustration, specific embodiments or examples. In the accompanying drawings, like numerals represent like elements through the several figures.

Figure 1:
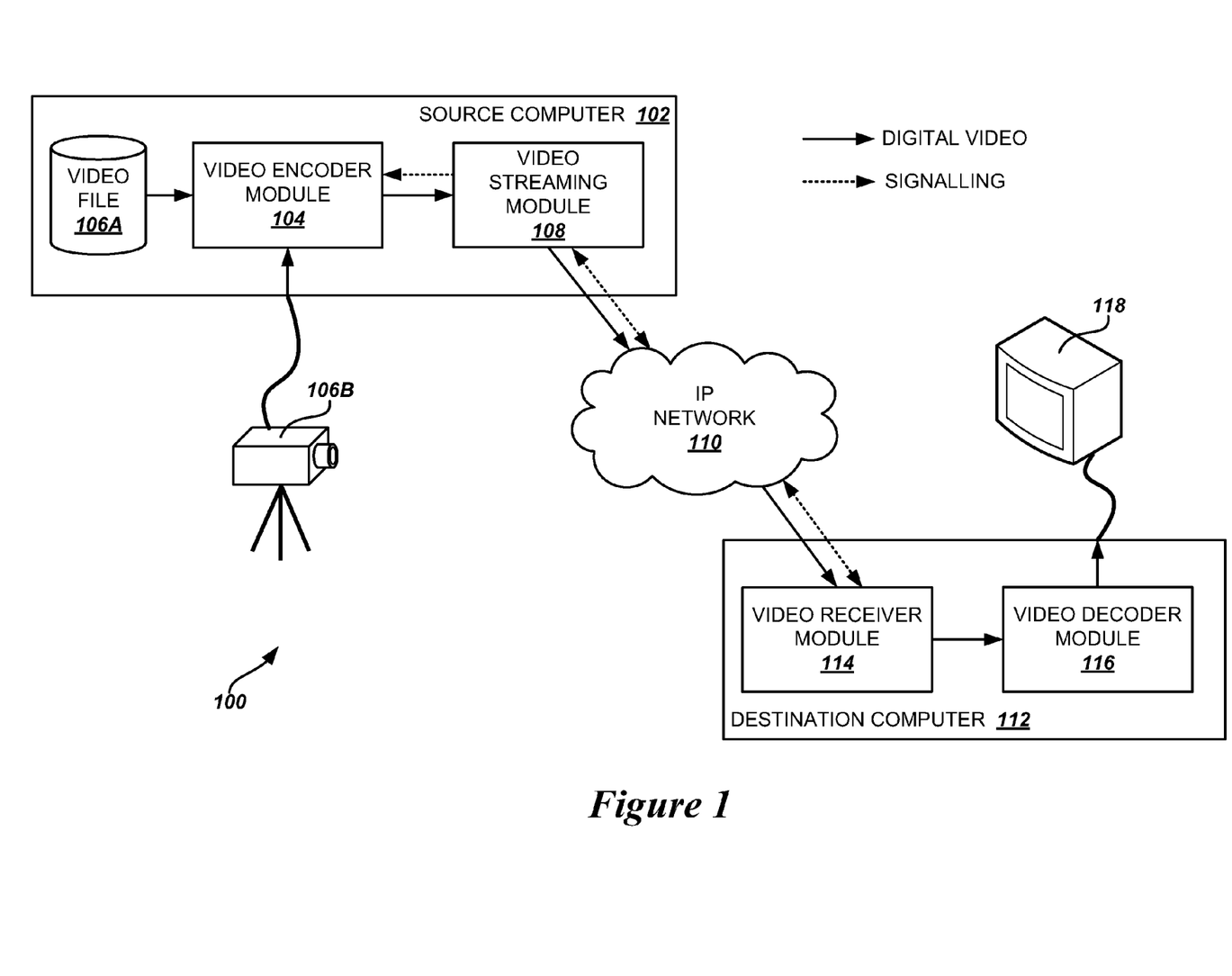
FIG. 1 is a block diagram showing aspects of an illustrative operating environment and several software components provided by the embodiments presented herein.

FIG. 1 shows an illustrative operating environment 100 including several software components for transmitting a video stream to a receiver across a network, according to embodiments provided herein. The environment 100 includes a source computer 102, which may be a server computer, personal computer ("PC"), a network appliance, or a special-purpose computing device. The source computer 102 contains a video encoder module 104. The video encoder module 104 is a software module or hardware component that receives digital video content from video sources 106A and 106B (also referred to herein as video source 106) and compresses and/or encodes the digital video content according to a specific standard or format into an encoded video stream.

According to embodiments, the video encoder module 104 may encode the digital video content from the video source 106 according to a proprietary standard, such as RTVideo utilized by OFFICE COMMUNICATIONS SERVER 2007 from MICROSOFT CORPORATION of Redmond. The video encoder module 104 may also encode the digital video content using an open standard, such as H.264/MPEG-4 AVC developed by the ITU-T Video Coding Experts Group (VCEG) together with the ISO/IEC Moving Picture Experts Group (MPEG), MPEG-2 developed by MPEG, or VC-1/SMPTE421M developed by the Society of Motion Picture and Television Engineers (SMPTE). It will be appreciated that the video encoder module 104 may encode the digital video content using any format that is recognized as suitable by one skilled in the art.

The video source 106 may be a video file 106A stored on the source computer 102 or on an external file system that contains digitized video content. The video file 106A may contain uncompressed or un-encoded digital video content or digital video encoded according to a specific format. According to one embodiment, if the video file 106A contains encoded digital video, the video encoder module 104 transcodes the encoded digital video to the format for the encoded video stream. The video source 106 may also be a digital video camera 106B or an analog video camera connected to the source computer 102 through an analog-to-digital converter. It will be appreciated that the video source 106 may be any device or data source known in the art that is capable of providing digital video content to the video encoder module 104.

The source computer 102 also contains a video streaming module 108. The video streaming module 108 is a software module or hardware component that receives the encoded video stream from the video encoder module 104 and transmits the encoded video stream over an IP network 110 to a destination computer 112. The IP network 110 may be the Internet, a local area network ("LAN"), or a wide-area network ("WAN"). The destination computer 112 may be a desktop computer, a laptop, a personal digital assistant ("PDA"), a digital cellular telephone, a set-top box, or any computing device connected to the IP network 110 capable of displaying digital video content.

The destination computer 112 includes a video receiver module 114. The video receiver module 114 may be a software module or hardware component that receives the encoded video stream over the network from the video streaming module 108 on the source computer 102. In one embodiment, the video streaming module 108 transmits the encoded video stream to the video receiver module 114 using a packetized protocol such as the Real-time Transport Protocol ("RTP"). The video receiver module 114 receives the RTP data packets from the video streaming module 108 and forwards the enclosed encoded video stream to a video decoder module 116, also contained on the destination computer 112. The video decoder module 116 may be a software module or hardware component that receives the encoded video stream from the video receiver module 114 and decodes the digital video content from the video stream. The video decoder module 116 may then display the video content on a display 118 attached to the destination computer 112.

Along with receiving the encoded video stream, the video receiver module 114 on the destination computer 112 may also exchange signaling information with the video streaming module 108 on the source computer 102. The signaling information may be exchanged through an out-of-band communication channel and may contain information regarding the RTP transmission of the encoded video stream, such as bytes sent, packets sent, lost packets, jitter, feedback, and round trip delay. According to one embodiment, the signaling information is exchanged between the video receiver module 114 and the video streaming module 108 utilizing the RTP Control Protocol ("RTCP") over the IP network 110.

For example, the video receiver module 114 may utilize RTCP to notify the video streaming module 108 that one or more packets of RTP data are corrupt or have been lost. Upon being informed of the lost packets, the video streaming module 108 may retransmit the packets or it may signal the video encoder module 104 to change the encoding pattern of the encoded video stream and send the new pattern to the video receiver module 114, as will be discussed in more detail in regard to FIG. 4.

According to embodiments, an encoded video stream is divided into a sequence of pictures or frames. The video encoder module 104 may encode each frame that makes up the video stream utilizing a different algorithm, each of which varies in the amount of compression achievable and thus the resulting size of the picture or frame to be transmitted. The standard picture types or frame types include I-frames, P-frames, and B-frames. In addition, many later-generation video compression or encoding standards, such as H.264 and RTVideo, include an SP-frame.

Intra-coded frames ("I-frames") or "key frames" are pictures that are encoded without reference to any other picture or frame. These frames allow the video decoder module 116 to generate the corresponding picture directly from the information encoded in the frame. I-frames provide a point for random access of the video content or for moving forward or backward through the video, such as with fast-forward or rewind functionality. However, because an I-frame contains all the information required to generate the corresponding picture, it may be larger in size than other frame types. For example, in a video stream encoded using RTVideo from digital video content played at 15 frames per second, transmitting an entire I-frame may involve sending 8 to 10 RTP packets. Consequently, to save bandwidth, the video encoder module 104 will produce as few I-frames in the encoded video stream as possible.

The other two types of standard frames are predicted picture frames ("P-frames") and bi-predictive frames ("B-frames"). P-frames are encoded with reference to the previous P-frame or key frame. In other words, they store only the changes in the picture since the last P-frame. B-frames are encoded with reference to both the previous and subsequent frames in the encoded video stream. Accordingly, P-frames and B-frames are significantly smaller than I-frames in size, involving approximately three RTP packets to transmit a P-frame and one or two packets to transmit a B-frame.

Super-P frames ("SP-frames") are encoded with reference to the proceeding I-frame or SP-frame. Because SP-frames are encoded using an algorithm similar to the P-frame, that is the SP-frame stores changes in the picture since the last key frame (I-frame) or SP-frame, they are similar in size to P-frames and significantly smaller than I-frames. However, the encoding algorithm for SP-frames allows them to be used like key frames for random access, fast-forward, or rewind functionality described above. SP-frames also typically occur more often than I-frames in the encoded video stream, providing more robust recovery if packet loss occurs, as will be described in more detail below in regard to FIGS. 3A-3D.

While the encoded video stream is described herein as being consistent with the H.264 or RTVideo standards comprising I-frames, SP-frames, P-frames and B-frames, it will be appreciated by one skilled in the art that the embodiments described herein may be used in connection with any type of video encoding scheme that uses temporal scalability, in other words, multiple layers or "scales", each capturing a different type of dependency in time.

Figure 2:
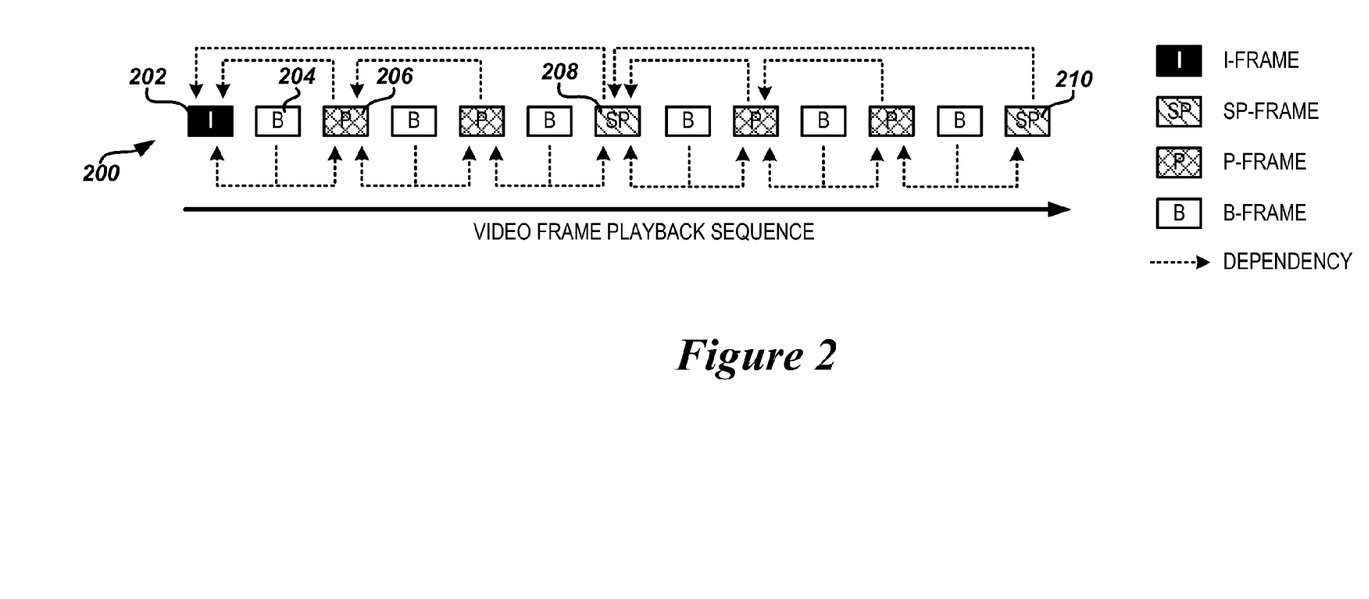
FIG. 2 is a block diagram showing an example of a playback sequence of video frame and the dependencies between the video frame types, according to embodiments presented herein.

FIG. 2 illustrates an example playback sequence 200 of an RTVideo encoded video stream containing the frame types described above, according to embodiments. The dependencies between the frames in the playback sequence are also shown in FIG. 2. The sequence 200 begins with a key frame, here an I-frame 202, typically sent once every 10 seconds.

The video decoder module 116 will render the first picture in the playback sequence 200 entirely from the information encoded in the initial I-frame 202. The next frame in the playback sequence 200 is a B-frame 204, from which the video decoder module 116 will render the next picture in the playback sequence 200.

As described above, the B-frame 204 may be encoded with reference to both the preceding frame (the I-frame 202) and the subsequent frame (the P-frame 206). It will be appreciated by one skilled in the art that the video decoder module 116 may refer to both the I-frame 202 and the P-frame 206 in decoding the picture from the B-frame 204. Thus, the playback sequence 200 illustrated in FIG. 2 does not necessarily match the order in which the frames are transmitted by the video streaming module 108 or received by the video receiver module 114, as will become apparent below in regard to FIGS. 3A-3D.

The next picture in playback sequence 200 is rendered by the video decoder module 116 from a P-frame 206, which is encoded in reference to the preceding I-frame 202. The video decoder module 116 continues to render pictures from alternating B-frames and P-frames in the playback sequence 200 until an intervening SP-frame 208 is encountered. The SP-frame 208 is encoded in reference to the last key frame (I-frame 202) or SP-frame, and typically occurs once per second. The SP-frame 208 serves as the basis for subsequently rendered frames until the next intervening SP-frame 210. In this way, any packet loss occurring between two SP-frames 208, 210 will only impact the playback sequence 200 between the two consecutive SP-frames 208, 210, and not beyond.

FIGS. 3A-3D illustrate aspects of a methodology for recovering from dropped frames in real-time video transmission over IP networks, according to embodiments. Each of the figures show a typical video frame sequence 300 of an encoded video stream, encoded from a video source 106 by the video encoder module 104 and placed in order of transmission to a receiver. It will be appreciated by one skilled in the art that the transmission sequence of the video frames may be different from the playback sequence, as illustrated in FIG. 2. The figures further show the sequence of video frames transmitted 302 by the video streaming module 108. Under ordinary circumstances, the sequence of video frames transmitted 302 and the typical video frame sequence 300 may be the same. However, according to embodiments, if packet loss occurs during transmission of the encoded video stream over the IP network 110, the video streaming module 108 may alter the transmission sequence of the video frames to recover from the loss, as will be described in more detail below.

FIGS. 3A-3D also show the sequence of video frames received 304 by video receiver module 114. The sequence of video frames received 304 is offset horizontally along a time scale to illustrate the network propagation delay from the video streaming module 108 to the video receiver module 114 over the IP network 110. This offset may represent one-half of the average round-trip time ("RTT") of the RTP communication between the video streaming module 108 and the video receiver module 114, as further illustrated in FIGS. 3A-3D. As described above, each frame of an encoded video stream may be divided by the video streaming module 108 into several RTP packets for transmission. If one or more of these packets are not received by the video receiver module 114, or if received packets have been corrupted, then the video receiver module 114 may not be able to reassemble the video frame conveyed in the lost or corrupt packets. In this case, the frame is said to be "dropped."

Figure 3A:
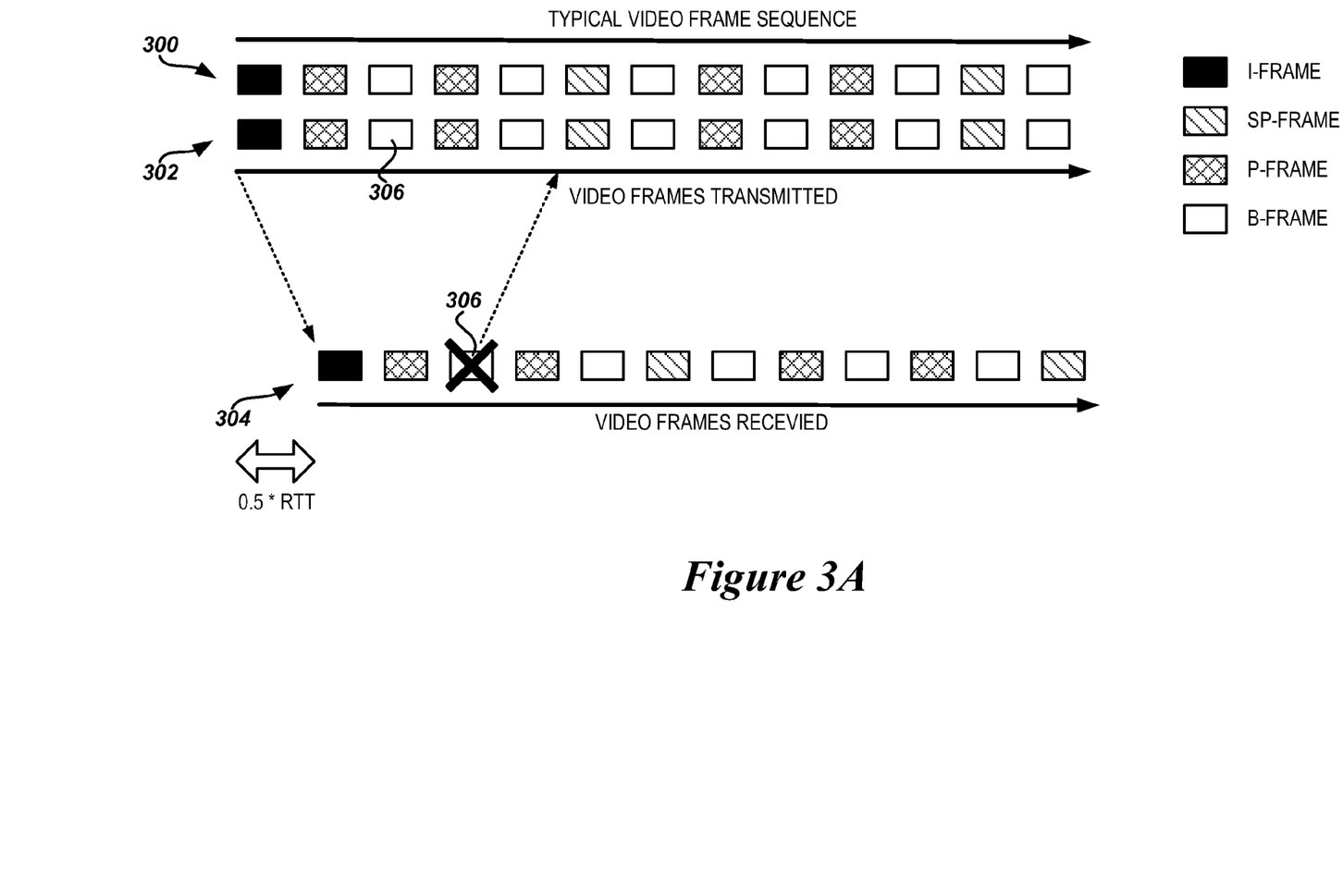
FIGS. 3A-3D are block diagrams showing examples of sequences of video frames transmitted and received in the real-time transmission of video over an IP network, according to embodiments described herein.

FIG. 3A shows an example of a dropped B-frame 306 from the encoded video stream. In this instance, the loss is isolated since the B-frame 306 contains information regarding only one picture in the playback sequence and is not used as a reference for any other frame. Further, the relative RTT in this example makes retransmission of the B-frame 306 (or the corresponding lost packets) impractical, in that the retransmitted frame would arrive too late to be useful in the playback of the encoded and decoded video stream. According to one embodiment, the video streaming module 108 in this instance will not resend the dropped B-frame 306 and the sequence of video frames transmitted 302 will not be altered. In another embodiment, the video receiver module 114 may not notify the video streaming module 108 of lost or corrupt packets conveying B-frames, eliminating the unnecessary signaling in these instances.

Figure 3B:
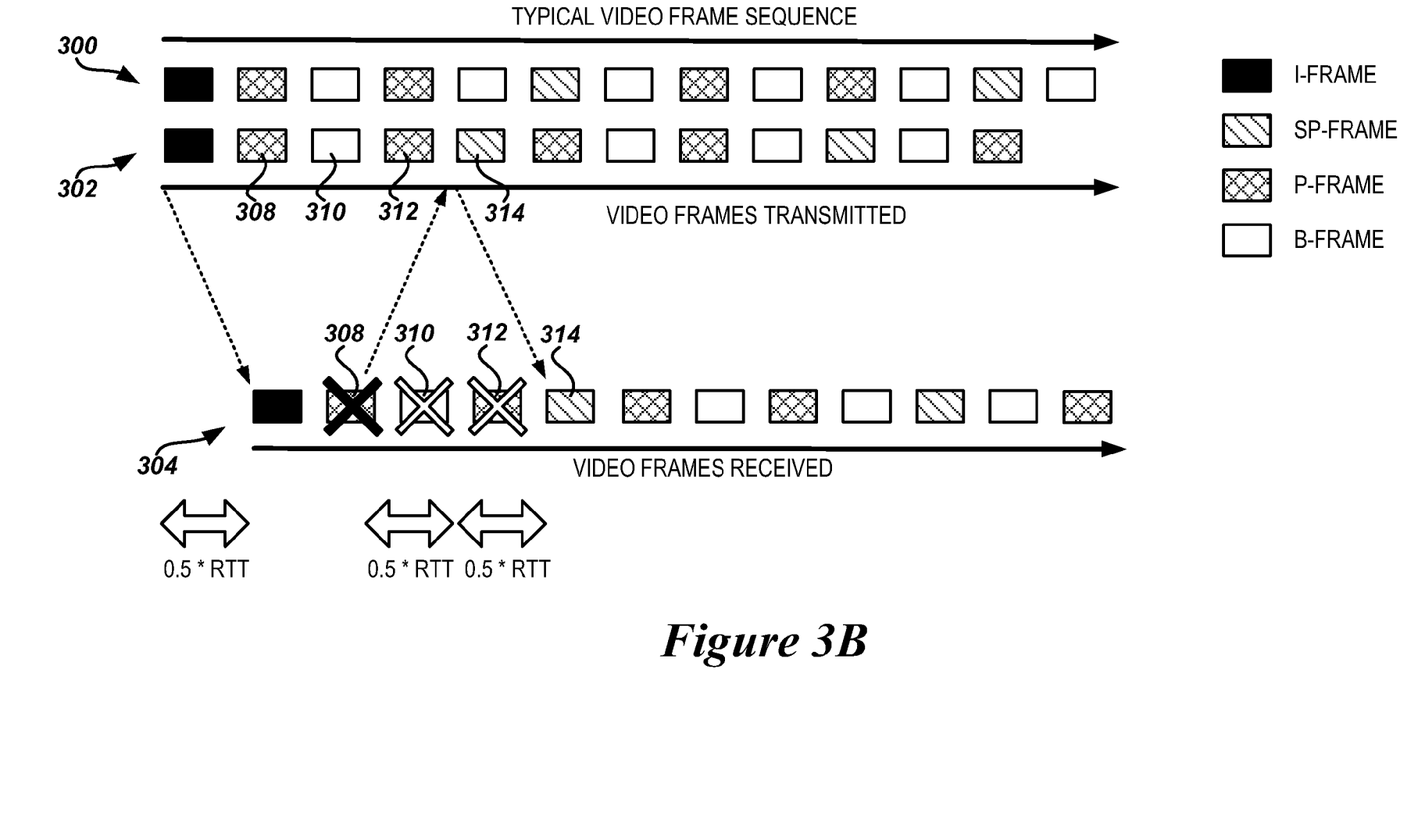

FIG. 3B shows an example of a P-frame 308 dropped from the sequence of video frames received 304. Since the dropped P-frame would normally serve as a reference for subsequent B-frames and P-frames, the loss associated with the dropped P-frame is not confined to the picture encoded in the P-frame but affects those encoded in subsequent B-frames 310 and P-frames 312 as well. Therefore, the dropped P-frame could result in a loss of video playback through the next key frame or SP-frame. Accordingly, the video receiver module 114 will notify the video streaming module 108 of the dropped P-frame 308 and request a replacement frame, according to embodiments.

If the RTT is relatively low, for example, less than 125 ms, the request for the replacement frame may arrive at the video streaming module 108 rather quickly. In this instance, the video streaming module 108 will instruct the video encoder module 104 to generate a new video frame sequence beginning with a new SP-frame 314, and transmit the new SP-frame 314 to the video receiver module 114, according to one embodiment. The video receiver module 114 and video decoder module 116 may then resume playback of the encoded video sequence. Even though the RTT is relatively small, a number of subsequent video frames, such as the P-frame 312 and the B-frame 310 illustrated in FIG. 3B, may be "lost" from the video playback while the video receiver module 114 waits for the new SP-frame 314.

Figure 3C:
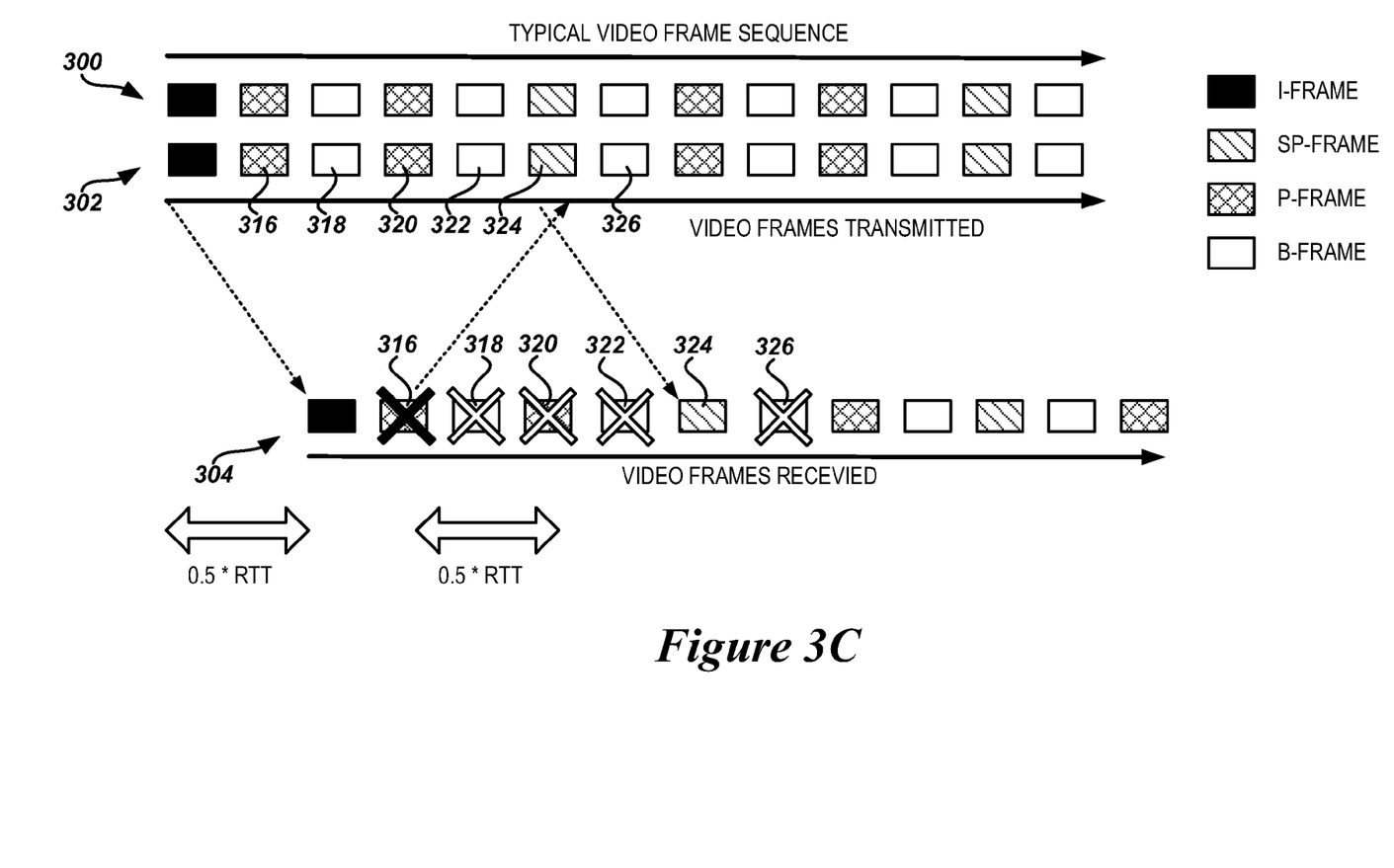

FIG. 3C shows another example of a P-frame 316 dropped from the sequence. In this example, the video receiver module 114 notifies the video streaming module 108 of the dropped P-frame 316 and requests a replacement frame, just as described above in regard to FIG. 3B. However, as further illustrated in FIG. 3C, the RTT in this instance is relatively large, for example greater than 250 ms. By the time the request for a replacement frame is received by the video streaming module 108, the video streaming module 108 has already transmitted an SP-frame 324 according to the typical (scheduled) video frame sequence 300. According to one embodiment, the video streaming module 108 in this instance will ignore the request for the replacement frame and the sequence of video frames transmitted 302 will not be not altered, since the SP-frame 324 already transmitted is sufficient for the video receiver module 114 and video decoder module 116 to continue playback of the encoded video sequence.

However, the higher RTT in this example may cause a number of video frames to be lost between the dropped P-frame 316 and the next SP-frame 324 in the sequence, such as the frames 318-322, because of the dependency of these frames on the dropped P-frame. In addition, the video decoder module 116 may be unable to decode the B-frame 326 received after the SP-frame 324, since the B-frame 326 may depend on both the SP-frame and the preceding P-frame 322, which could not be decoded.

Figure 3D:
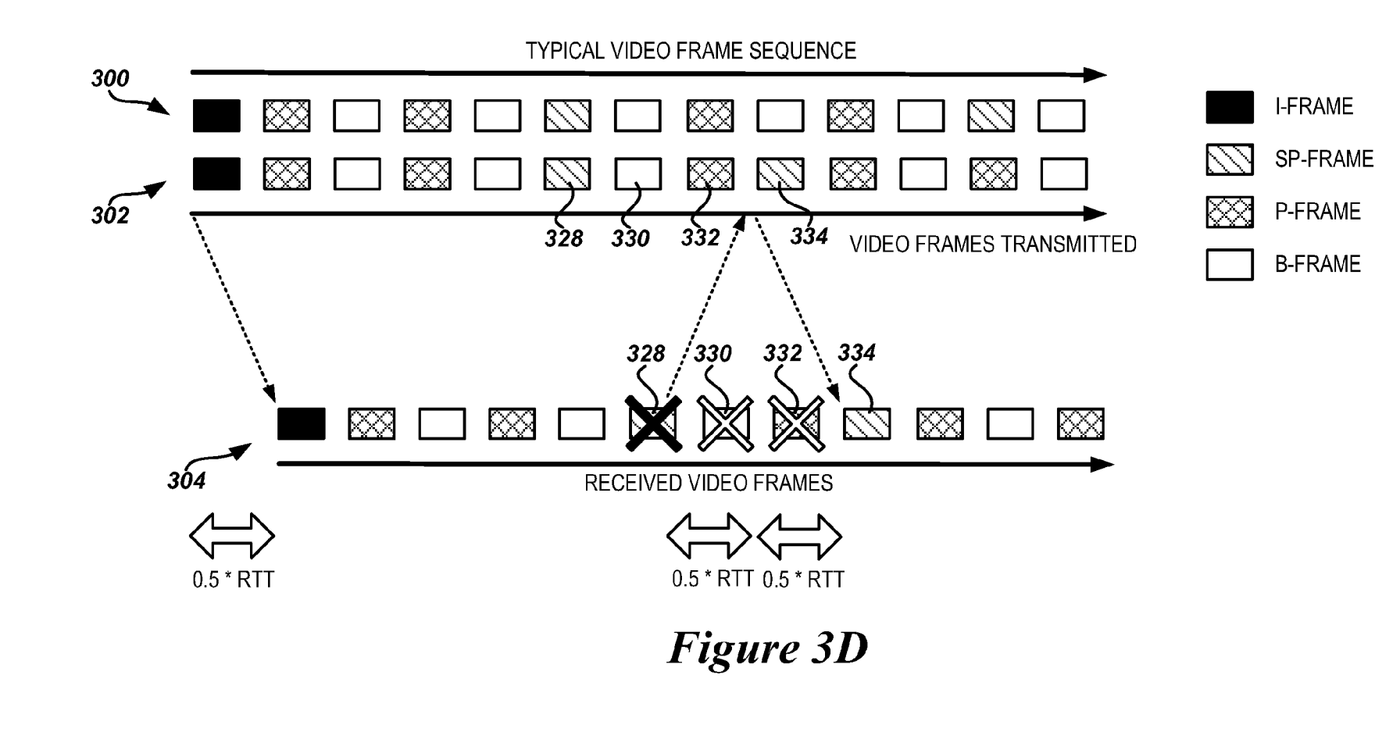

FIG. 3D shows an example of a SP-frame 328 dropped from the encoded video stream. According to embodiments, when an SP-frame 328 is dropped, the video receiver module 114 will notify the video streaming module 108 of the dropped SP-frame and request a replacement frame. In one embodiment, the video streaming module 108 will instruct the video encoder module 104 to generate a new video frame sequence beginning with a new SP-frame 334, and transmit the new SP-frame to the video receiver module 114. The video receiver module 114 and video decoder module 116 may then resume playback of the encoded video sequence. Depending on the RTT, a number of pictures, such as the P-frame 332 and the B-frame 330 illustrated in FIG. 3D, may be dropped from the video playback while the video receiver module 114 waits for the replacement SP-frame 334. Similarly, if an I-frame is dropped, the video streaming module 108 will instruct the video encoder module 104 to generate a new video frame sequence beginning with a new I-frame, and transmit the new I-frame to the video receiver module 114.

In another embodiment, when an SP-frame 328 is dropped, the video streaming module 108 may instruct the video encoder module 104 to generate a new video frame sequence beginning with a new I-frame, and transmit the new I-frame to the video receiver module 114 as the replacement frame. The determination of whether to replace a dropped SP-frame with an I-frame or another SP-frame may be a matter of choice in the implementation that depends on a number of factors, including, but not limited to, the number of SP-frame buffers available in the video encoder module 104 and the video decoder module 116. For example, if the encoder and decoder have only a single SP-frame buffer that contains the last valid transmitted and received SP-frame, then an I-frame may be requested to replace the dropped SP-frame, as the SP-frame buffer in the encoder has already been overwritten with the contents of a new SP-frame. In yet a further embodiment, the video streaming module 108 may determine whether to replace a dropped SP-frame with an I-frame or another SP-frame in real-time, based on the amount of time since the transmission of the last, successful SP-frame.

Figure 4:
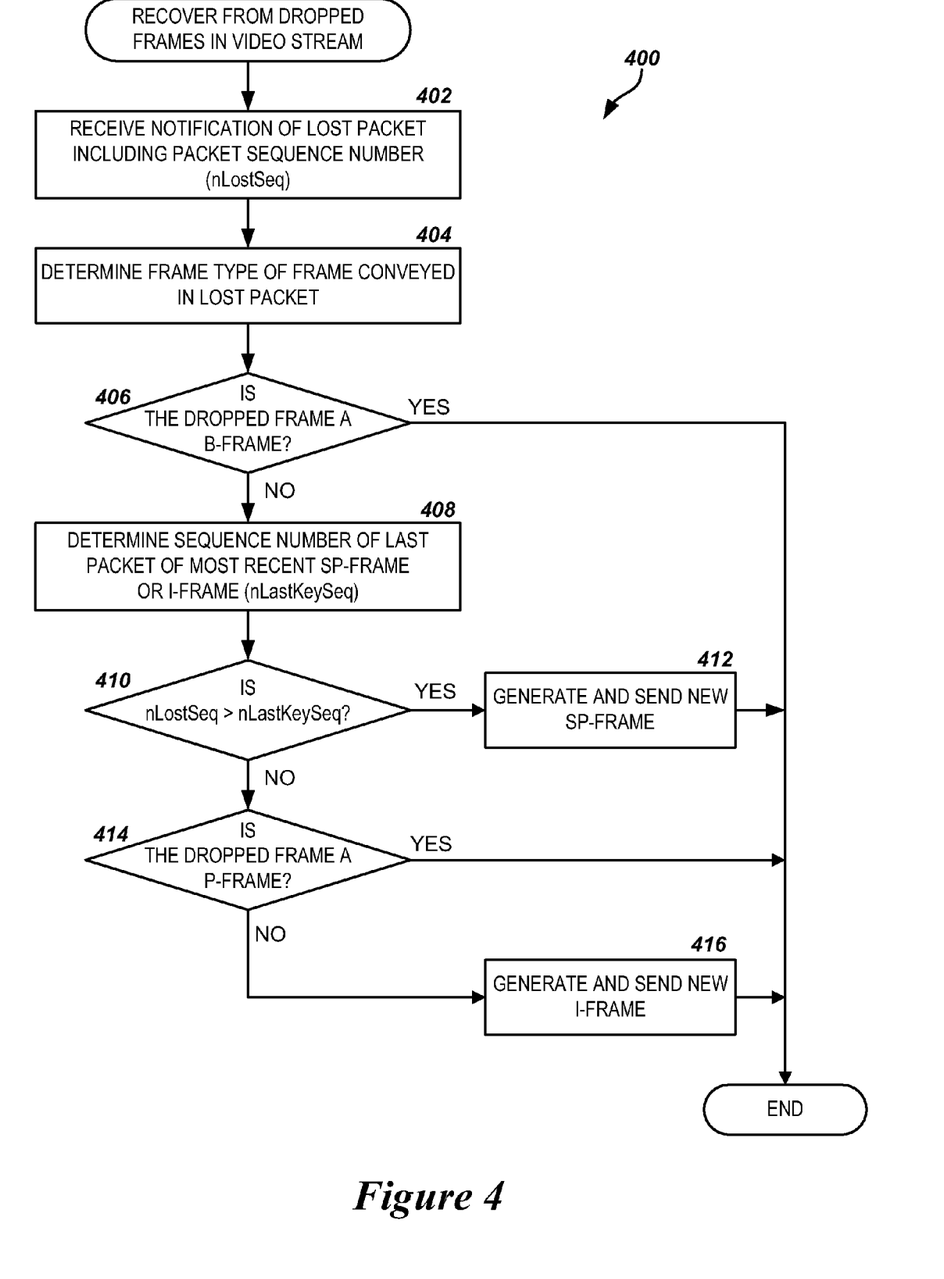
FIG. 4 is a flow diagram showing methods for recovering from dropped frames in the real-time transmission of video, according to embodiments described herein.

Referring now to FIG. 4, additional details will be provided regarding the embodiments presented herein. It should be appreciated that the logical operations described with respect to FIG. 4 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIG. 4 illustrates an exemplary routine 400 used by the video streaming module 108 described above to respond to notifications of dropped frames from the video receiver module 114, in accordance with the embodiments described herein. The routine 400 begins at operation 402, where the video streaming module 108 receives notification of a dropped frame from the encoded video stream from the video receiver module 114.

As described above each frame of an encoded video stream may be divided into several packets for transmission across the IP network 110. According to embodiments, the video streaming module 108 generates a sequence number for each packet sent to the destination computer 112. The video streaming module 108 may keep a number of the last packets sent to the video receiver module 114 in a buffer or cache, along with information regarding the sequence number of each packet and the particular frame of the encoded video stream conveyed in the packet. When one or more packets are lost or corrupt, the video receiver module 114 will notify the video streaming module 108 of the missing or corrupt packets, providing the sequence numbers of the packets. When the video streaming module 108 receives the notification of the lost packets, the video streaming module may use the provided sequence numbers and the information maintained in the buffer or cache to determine the appropriate response, according to embodiments.

From operation 402, the routine 400 proceeds to operation 404, where the video streaming module 108 determines the frame type of the dropped frame, in other words, the frame conveyed in the lost packet or packets, according to the provided sequence number(s) from the video receiver module 114. This information may be obtained from the buffer or cache maintained by the video streaming module 108. Next, at operation 406, the video streaming module 108 determines if the frame dropped from the encoded video stream was a B-frame. If the dropped frame was a B-frame, the routine 400 ends. As described above in regard to FIG. 3A, the video streaming module 108 will ignore the notification of the dropped frame if the dropped frame is a B-frame and the sequence of video frames transmitted 302 will not be altered.

If, however, the dropped frame was not a B-frame, the routine 400 proceeds from operation 406 to operation 408, where the video streaming module 108 determines the sequence number of the last packet conveying the most recently transmitted key frame (I-frame) or SP-frame. This information may be obtained from the buffer or cache maintained by the video streaming module 108. Next, at operation 410, the video streaming module 108 determines if the sequence number of the lost packet(s) is greater than the sequence number of the last packet conveying the most recent key frame, in this case an I-frame or SP-frame. This may correspond to a situation where the RTT is low or the packet loss occurred at the beginning of a group of pictures delimited by a pair of I-frames and/or SP-frames, as illustrated in FIG. 3B above.

If the sequence number of the lost packet(s) is greater than the sequence number of the last packet conveying the most recent I-frame or SP-frame, the routine 400 proceeds from operation 410 to operation 412, where the video streaming module 108 instructs the video encoder module 104 to generate a new video frame sequence beginning with a new SP-frame, and transmits the new SP-frame to the video receiver module 114, as described above in regard to FIG. 3B. From operation 412, the routine 400 then ends.

However, if the sequence number of the lost packet(s) is not greater than the sequence number of the last packet conveying the most recent I-frame or SP-frame, the routine 400 proceeds from operation 410 to operation 414, where the video streaming module 108 determines if the frame dropped from the encoded video stream was a P-frame. This may be the case if the RTT is large or the packet loss occurred near the end of a group of pictures delimited by a pair of I-frames and/or SP-frames, and the video streaming module 108 has already sent a subsequent SP-frame before the notification of the dropped P-frame is received, as described above in regard to FIG. 3C.

If the sequence number of the lost packet(s) is not greater than the sequence number of the last packet conveying the most recent I-frame or SP-frame, and the dropped frame was a P-frame, the routine 400 ends and the video streaming module 108 ignores the notification of the dropped P-frame.

If, however, the dropped frame was not a P-frame, the routine 400 proceeds from operation 414 to operation 416, where the video streaming module 108 sends a new key frame (I-frame) to the video receiver module 114. This may be the case when an SP-frame or an I-frame is dropped, as illustrated above in FIG. 3D. In another embodiment, if an SP-frame is dropped, then the video streaming module 108 may send a new SP-frame to the to the video receiver module 114, as further discussed above in regard to FIG. 3D. The video streaming module 108 instructs the video encoder module 104 to generate a new video frame sequence beginning with the new I-frame or SP-frame, and transmits the new I-frame or SP-frame to the video receiver module 114. The video receiver module 114 and video decoder module 116 may then resume playback of the encoded video sequence. From operation 416, the routine 400 ends.

It will be appreciated that the routine 400 described above increases the efficiency of the transmission of the encoded video stream by minimizing the number of re-transmitted frames to those cases where the re-transmitted frames would be useful to the video decoder. Other rules may be incorporated into the routine 400 as well. In one embodiment, the video streaming module 108 may monitor the average bitrate for the transmission of the encoded video stream, through the information exchanged with the video receiver module 114 via RTCP for example, and prevent sending replacement SP-frames when the increase in the instantaneous video bitrate would exceed a threshold value. This may be the case when the IP network 110 is very lossy, and limited bandwidth necessitates adding a procedure to control the bitrate.

According to another embodiment, a throttling mechanism may be incorporated into the routine 400 to control the transmission of additional SP-frames. Requests from the video receiver module 114 for a new SP-frame may be aggregated by the video streaming module 108 over a period of time, for example 250 ms, and only one replacement SP-frame issued at the end of each 250 ms period where there was at least one request. In yet another embodiment, the decision to send a replacement SP-frame may be made based on the average RTT value and the time until the video encoder module 104 will produce a new SP-frame in the typical video frame sequence 300.

It will be further appreciated that, while the video streaming module 108 is illustrated in FIG. 1 as transmitting the encoded video stream to one destination computer 112, and the video streaming module is described herein as responding to requests for replacement frames from a single video receiver module 114, the encoded video stream transmitted by the video streaming module may be forwarded to a number of destination computers 112. In this case, the routine 400 may be modified to evaluate the requests from multiple destination computers in order to make the appropriate determination of when to re-transmit a replacement frame and of what type the replacement frame should be.

Figure 5:
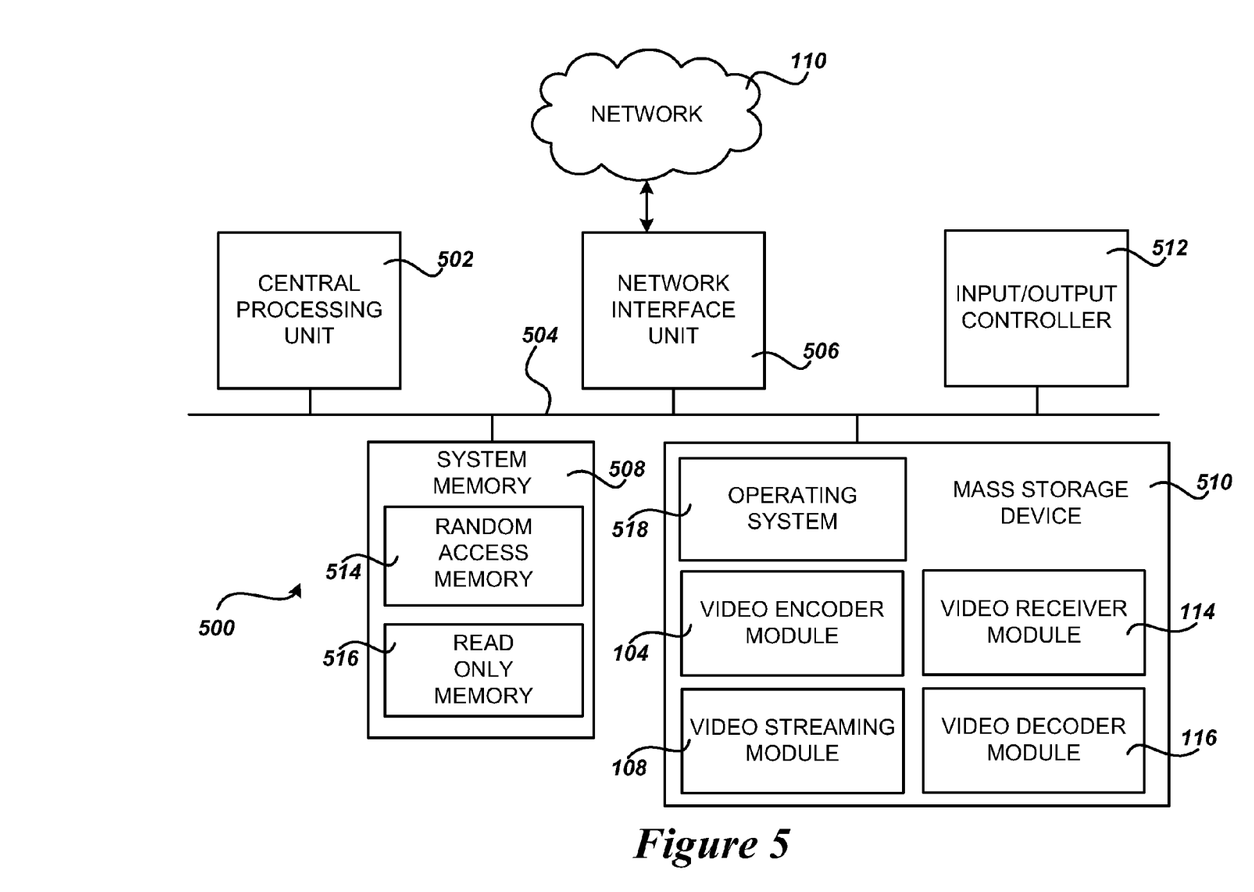
FIG. 5 is a block diagram showing illustrative computer hardware and software architectures for a computing system capable of implementing aspects of the embodiments presented herein.

FIG. 5 shows an example computer architecture for computers 500 capable of executing the software components described herein for recovering from dropped frames in real-time transmission of video over IP networks, in the manner presented above. The computer architecture shown in FIG. 5 illustrates a conventional computing device, PDA, cellular phone, communication device, desktop computer, laptop, or server computer and may be utilized to execute any aspects of the software components presented herein described as executing on the source computer 102, the destination computer 112, or other computing platform.

The computer architecture shown in FIG. 5 includes a central processing unit 502 (CPU), a system memory 508, including a random access memory 514 (RAM) and a read-only memory 516 (ROM), and a system bus 504 that couples the memory to the CPU 502. A basic input/output system containing the basic routines that help to transfer information between elements within the computer 500, such as during startup, is stored in the ROM 516. The computer 500 also includes a mass storage device 510 for storing an operating system 518, application programs, and other program modules, which are described in greater detail herein.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 500.

According to various embodiments, the computer 500 may operate in a networked environment using logical connections to remote computers through a network, such as the IP network 110. The computer 500 may connect to the IP network 110 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a digital video camera 106B, a keyboard, a mouse, or an electronic stylus (not shown in FIG. 5). Similarly, an input/output controller may provide output to a display 118, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a computer. The mass storage device 510 and RAM 514 may also store one or more program modules. In particular, the mass storage device 510 and the RAM 514 may store the video encoder module 104, the video streaming module 108, the video receiver module 114, or the video decoder module 116, each of which was described in detail above in regard to FIG. 1. The mass storage device 510 and the RAM 514 may also store other types of program modules or data.

Based on the foregoing, it should be appreciated that technologies for recovering from dropped frames in real-time transmission of video over IP networks are provided herein.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for recovering from a loss of a data packet while transmitting a sequence of video frames to a receiver over a network, the method comprising running computer-executable instructions on a computer to perform the operations of:
    receiving at the computer a notification from the receiver that a data packet has been lost, the notification specifying a sequence number of the lost data packet;
    upon receiving the notification, determining from the sequence number of the lost data packet a type of a video frame conveyed by the lost data packet;
    determining the sequence number of a last data packet of a most recent key frame of the sequence of video frames transmitted to the receiver;
    determining if the video frame conveyed by the lost data packet comprises a B-frame type;
    upon determining that the video frame conveyed by the lost data packet comprises the B-frame type, ignoring the notification;
    upon determining that the video frame conveyed by the lost data packet does not comprise the B-frame type, determining if the sequence number of the lost data packet is greater than the sequence number of the last data packet of the most recent key frame of the sequence of video frames transmitted to the receiver;
    upon determining that the sequence number of the lost data packet is greater than the sequence number of the last data packet of the most recent key frame, generating a new video frame of an SP-frame type and transmitting the new video frame of the SP-frame type from the computer to the receiver;
    upon determining that the sequence number of the lost data packet is not greater than the sequence number of the last data packet of the most recent key frame, determining if the video frame conveyed by the lost data packet comprises the P-frame type;
    upon determining that the video frame conveyed by the lost data packet comprises the P-frame type, ignoring the notification; and
    upon determining that the video frame conveyed by the lost data packet does not comprise the P-frame type, generating a new video frame comprising a frame of an I-frame type or the SP-frame type, and transmitting the new video frame from the computer to the receiver.

2. The method of claim 1, wherein the sequence of video frames comprises a plurality of video frames of one of the I-frame type, the SP-frame type, the P-frame type, and the B-frame type.

3. The method of claim 1, wherein the most recent key frame comprises the most recent video frame of the SP-frame type transmitted to the receiver.

4. The method of claim 2, wherein the replacement video frame comprises a video frame of the I-frame type or the SP-frame type.

5. The method of claim 1, wherein determining a type of the new video frame to generate and transmit to the receiver upon determining that the video frame conveyed by the lost data packet does not comprise the P-frame type depends upon a number of available SP-frame buffers in a video encoder module.

6. The method of claim 1, wherein the network comprises an Internet Protocol ("IP") network and wherein the data packet comprises a Real-time Transmission Protocol ("RTP") packet.

7. The method claim 1, wherein the sequence of video frames comprises a sequence of video frames encoded according to one of an RTVideo standard, an H.264 standard, an MPEG-2 standard, and a VC-1 standard.

8. The method of claim 1, wherein transmitting the new video frame of the SP-frame type from the computer to the receiver is controlled by a throttling mechanism.

9. A system for recovering from a loss of a data packet in a transmission of a sequence of video frames to a destination computer over a network, the system comprising:
    a source computer operatively connected to the network; and
    a video streaming module executing on the source computer and operative to
        receive a notification from the destination computer that the data packet has been lost, the notification specifying a sequence number of the lost data packet,
        determine from the sequence number of the lost data packet a type of a video frame conveyed by the lost data packet,
        determine the sequence number of a last data packet of a most recent key frame of the sequence of video frames transmitted to the destination computer,
        determine if the video frame conveyed by the lost data packet comprises a B-frame type,
        upon determining that the video frame conveyed by the lost data packet comprises the B-frame, type ignore the notification,
        upon determining that the video frame conveyed by the lost data packet does not coin rise the B-frame type, determine if the sequence number of the lost data packet is greater than the sequence number of the last data packet of the most recent key frame of the sequence of video frames transmitted to the destination computer,
        upon determining that the sequence number of the lost data packet is greater than the sequence number of the last data packet of the most recent key frame, generate a new video frame of an SP-frame type and transmit the new video frame of the SP-frame type to the destination computer,
        upon determining that the sequence number of the lost data packet is not greater than the sequence number of the last data packet of the most recent key frame, determine if the video frame conveyed by the lost data packet comprises a P-frame type,
        upon determining that the video frame conveyed by the lost data packet comprises the P-frame type, ignore the notification, and
        upon determining that the video frame conveyed by the lost data packet does not comprise the P-frame type, generate a new video frame comprising one of a frame of an I-frame type or a frame of the SP-frame type, and transmit the new video frame to the destination computer.

10. The system of claim 9, wherein the sequence of video frames comprises a plurality of video frames of one of the I-frame type, the SP-frame type, the P-frame type, and the B-frame type.

11. The system of claim 9, wherein the most recent key frame comprises the most recent video frame of the SP-frame type transmitted to the destination computer.

12. The system of claim 10, wherein the replacement video frame comprises a video frame of the I-frame type or the SP-frame type.

13. The system of claim 9, wherein determining a type of the new video frame to generate and transmit to the destination computer upon determining that the video frame conveyed by the lost data packet does not comprise the P-frame type depends upon a number of available SP-frame buffers in the video streaming module.

14. The system of claim 9, wherein the network comprises an Internet Protocol ("IP") network and wherein the data packet comprises a Real-time Transmission Protocol ("RTP") packet.

15. The system of claim 9, wherein the sequence of video frames comprises a sequence of video frames encoded according to one of an RTVideo standard, an H.264 standard, an MPEG-2 standard, and a VC-1 standard.

16. The system of claim 9, wherein transmitting the new video frame of the SP-frame type from the computer to the destination computer is controlled by a throttling mechanism.

17. A computer-readable storage medium comprising one of an optical disk, a solid state storage device, or a magnetic storage device, having computer executable instructions stored thereon that, when executed by a computer operatively connected to a network, cause the computer to:
receive a notification from a destination computer operatively connected to the network that a data packet of a plurality of data packets conveying a sequence of video frames has been lost, the notification specifying a sequence number of the lost data packet;
determine if a video frame conveyed by the lost data packet comprises a B-frame type;
upon determining that the video frame conveyed by the lost data packet comprises the B-frame type, ignore the notification;
upon determining that the video frame conveyed by the lost data packet is not the B-frame type, determine if the sequence number of the lost data packet is greater than a sequence number of a last data packet of a most recent video frame of an I-frame type or an SP-frame type transmitted to the destination computer;
upon determining that the sequence number of the lost data packet is greater than the sequence number of the last data packet of the most recent video frame of the I-frame type or the SP-frame type transmitted to the destination computer, generate a new video frame of the SP-frame type to replace the video frame of the lost data packet and transmit the new video frame of the SP-frame type to the destination computer;
upon determining that the sequence number of the lost data packet is not greater than the sequence number of the last data packet of the most recent video frame of the I-frame type or the SP-frame type transmitted to the destination computer, determine if the video frame conveyed by the lost data packet comprises a P-frame type;
upon determining that the video frame conveyed by the lost data packet comprises the P-frame type, ignore the notification; and
upon determining that the video frame conveyed by the lost data packet does not comprise the P-frame type, generate a new video frame of the I-frame type to replace the video frame of the lost data packet and transmit the new video frame of the I-frame type to the destination computer.

18. The computer-readable storage medium comprising one of an optical disk, a solid state storage device, or a magnetic storage device, of claim 17, wherein the sequence of video frames comprises a sequence of video frames encoded according to one of an RTVideo standard, an H.264 standard, an MPEG-2 standard, and a VC-1 standard.

19. The computer-readable storage medium comprising one of an optical disk, a solid state storage device, or a magnetic storage device, of claim 17, wherein determining a type of the new video frame to generate and transmit to the destination computer upon determining that the video frame conveyed by the lost data packet does not comprise the P-frame type depends upon a number of available SP-frame buffers in a video encoder module.

20. The computer-readable storage medium comprising one of an optical disk, a solid state storage device, or a magnetic storage device, of claim 17, wherein transmitting the new video frame of the SP-frame type from the computer to the destination computer is controlled by a throttling mechanism.

* * * * *